(12) United States Patent
Zhou et al.

(10) Patent No.: US 12,442,545 B2
(45) Date of Patent: Oct. 14, 2025

(54) WALL-MOUNTED AIR CONDITIONER

(71) Applicants: GD Midea Heating & Ventilating Equipment Co., Ltd., Foshan (CN); Hefei Midea Heating & Ventilating Equipment Co., Ltd., Hefei (CN)

(72) Inventors: Baisong Zhou, Foshan (CN); Duode Wu, Foshan (CN); Yuan Yang, Foshan (CN); Bo Li, Foshan (CN); Yongqiang Wan, Foshan (CN); Qiqin Su, Foshan (CN); Yunchong Tu, Foshan (CN)

(73) Assignees: GD Midea Heating & Ventilating Equipment Co., Ltd., Foshan (CN); Hefei Midea Heating & Ventilating Equipment Co., Ltd., Hefei (CN)

( * ) Notice: Subject to any disclaimer, the term of this patent is extended or adjusted under 35 U.S.C. 154(b) by 132 days.

(21) Appl. No.: 18/386,115

(22) Filed: Nov. 1, 2023

(65) Prior Publication Data

US 2024/0060657 A1 Feb. 22, 2024

Related U.S. Application Data

(63) Continuation of application No. PCT/CN2022/076091, filed on Feb. 11, 2022.

(30) Foreign Application Priority Data

Jun. 1, 2021 (CN) .......................... 202121216517.6

(51) Int. Cl.
*F24F 1/0057* (2019.01)
*F24F 1/0025* (2019.01)
(Continued)

(52) U.S. Cl.
CPC .......... *F24F 1/0057* (2019.02); *F24F 1/0025* (2013.01); *F24F 1/0067* (2019.02); *F24F 1/0073* (2019.02)

(58) Field of Classification Search
CPC ...... F24F 1/0018; F24F 1/0022; F24F 1/0057; F24F 1/0063; F24F 1/0067; F24F 1/0073;
(Continued)

(56) References Cited

U.S. PATENT DOCUMENTS 5,211,219 A   5/1993   Kawabata et al.
5,341,650 A * 8/1994   Nagasawa ............. F24F 1/0067
                                                    62/186
(Continued)

FOREIGN PATENT DOCUMENTS

CN    1298079 A    6/2001
CN    1576728 A    2/2005
(Continued)

OTHER PUBLICATIONS

Midea Group Co., Ltd., Japanese Office Action, JP Patent Application No. 2023-565541, Dec. 3, 2024, 8 pgs.
(Continued)

*Primary Examiner* — Joseph F Trpisovsky
(74) *Attorney, Agent, or Firm* — Morgan, Lewis & Bockius LLP

(57) ABSTRACT

A wall-mounted air conditioner includes a housing and a heat exchanger. A front surface of the housing is provided with a first air inlet; the heat exchanger is arranged in the housing and opposite the first air inlet; and the heat exchanger is curved or bent towards the first air inlet.

16 Claims, 3 Drawing Sheets

(51) Int. Cl.
*F24F 1/0067* (2019.01)
*F24F 1/0073* (2019.01)

(58) Field of Classification Search
CPC .. F24F 1/027; F24F 1/028; F24F 1/029; F24F 1/0314; F24F 1/031; F24F 2013/205
See application file for complete search history.

(56) References Cited

U.S. PATENT DOCUMENTS

| | | | |
|---|---|---|---|
| 5,573,059 A * | 11/1996 | Hamamoto | F24F 1/0083 165/122 |
| 5,857,343 A * | 1/1999 | Cho | F24F 1/005 62/131 |
| 2011/0120167 A1* | 5/2011 | Lingrey | F24F 13/20 62/507 |

FOREIGN PATENT DOCUMENTS

| | | |
|---|---|---|
| CN | 108458406 A | 8/2018 |
| CN | 111936792 A | 11/2020 |
| CN | 215372682 U | 12/2021 |
| EP | 0668473 B1 | 4/2001 |
| GB | 2302937 A * | 2/1997 ........... B23K 3/0471 |
| JP | H 0763362 A | 3/1995 |
| JP | H 08110085 A | 4/1996 |
| JP | H 0942699 A | 2/1997 |
| JP | H 10220864 A | 8/1998 |
| JP | 2000039171 A | 2/2000 |
| JP | 2002156134 A | 5/2002 |
| JP | 2010019500 A | 1/2010 |
| KR | 20010001482 U | 1/2001 |
| WO | WO 1998019112 A1 | 5/1998 |

OTHER PUBLICATIONS

Midea Group Co., Ltd., ISR, PCT/CN2022/076091, Apr. 24, 2022, 3 pgs.
Midea Group Co., Ltd., WO, PCT/CN2022/07691, Apr. 24, 2022, 6 pgs.
Midea Group Co., Ltd., IPRP, PCT/CN2022/07691, Nov. 21, 2023, 7 pgs.
Midea Group Co., Ltd., Extended European Search Report, EP Patent Application No. 22814730.2, Jun. 5, 2024, 9 pgs.
Midea Group Co., Ltd., Australian Office Action, AU Patent Application No. 2022286885, Mar. 10, 2025, 5 pgs.
Midea Group Co., Ltd., Canadian Office Action, CA Application No. 3,219,504, Mar. 14, 2025, 5 pgs.
Midea Group Co., Ltd., Korean Office Action, KR Patent Application No. 10-2023-7037299, Mar. 17, 2025, 13 pgs.

* cited by examiner

WALL-MOUNTED AIR CONDITIONER

CROSS-REFERENCE TO RELATED APPLICATION

The present application is a continuation of International (PCT) Patent Application No. PCT/CN2022/076091 filed on Feb. 11, 2022, which claims the priority of Chinese patent application serial No. 202121216517.6 filed on Jun. 1, 2021 in China, the content of which is incorporated herein by reference.

FIELD

The present disclosure relates to a field of air conditioning technologies, and more particularly to a wall-mounted air conditioner.

BACKGROUND

An air inlet of wall-mounted air conditioners may be arranged in a top portion of the wall-mounted air-conditioners. To receive the air from the top portion of the wall-mounted air-conditioners, the wall-mounted air conditioners may be spaced apart from an indoor top wall at a large distance, which may result in low indoor space utilization and may make the indoor space more cramped. In addition, a structural layout of a heat exchanger and the air inlet may lead to low heat exchange efficiency of the wall-mounted air conditioners.

SUMMARY

Some embodiments of the present disclosure include a wall-mounted air conditioner that may reduce or eliminate a distance between the wall-mounted air conditioner and an indoor top wall, and the wall-mounted air conditioner may have high heat exchange efficiency.

The wall-mounted air conditioner according to embodiments of the present disclosure includes a housing and a heat exchanger. A front surface of the housing is provided with a first air inlet. The heat exchanger is arranged in the housing and corresponding to the first air inlet. The heat exchanger is curved or bent towards the first air inlet.

In some embodiments of the wall-mounted air conditioner of the present disclosure, the first air inlet is arranged in the front surface of the housing, the wall-mounted air conditioner can achieve air inflow from the front, and a top of the housing may be mounted close to the indoor top wall, which does not affect the air inflow efficiency of the wall-mounted air conditioner and may improve indoor space utilization. In addition, the heat exchanger is corresponding to the first air inlet, such that the air entering the housing may directly contact the heat exchanger for heat exchange to shorten an air inflow path of the wall-mounted air conditioner. Moreover, the heat exchanger has a curved or bent structure, and thus a heat exchange area of the heat exchanger may be increased, which may improve the heat exchange efficiency of the wall-mounted air conditioner.

In some embodiments, the heat exchanger is arced towards the first air inlet.

In some embodiments, a thickness of the heat exchanger gradually decreases along a direction from a middle portion of the heat exchanger to an upper end of the heat exchanger, and the thickness of the heat exchanger gradually decreases along a direction from the middle portion of the heat exchanger to a lower end of the heat exchanger.

In some embodiments, the housing is provided with a fan wheel, and a position of the middle portion of the heat exchanger is higher than a rotation axis of the fan wheel.

In some embodiments, the wall-mounted air conditioner further includes an air duct and a fan wheel, wherein the air duct is formed in the housing, the air duct includes an air inflow section and an air outflow section connected to each other, a part of the fan wheel is located in the air inflow section, a remaining portion (e.g., the rest, or all remaining portions) of the fan wheel is located in the air outflow section, and at least a part of the heat exchanger is located in the air inflow section.

In some embodiments, in a vertical plane perpendicular to a length direction of the air duct, the rotation axis of the fan wheel and the vertical plane are intersected at a base point, and a first connection line between a middle point of a projection of an inner side surface of the heat exchanger substantially coincides with a centerline of the air inflow section.

In some embodiments, the housing has a second air inlet, and the second air inlet is located in a top surface of the housing.

In some embodiments, the housing is provided with a fan wheel, and a part of the heat exchanger is located between the first air inlet and the fan wheel, and another part of the heat exchanger is located between the second air inlet and the fan wheel.

In some embodiments, the wall-mounted air conditioner further includes an air-inlet grille, wherein the air-inlet grille comprises a frame and a plurality of blades, the frame is arranged at the first air inlet, and the plurality of blades is arranged on the frame at intervals.

In some embodiments, each blade is rotatably arranged on the frame between an open position and a closed position.

In in some embodiments, in the closed position, a cross section of the air-inlet grille is an arc-shaped surface protruding outwards.

In some embodiments, the wall-mounted air conditioner further includes a filter screen arranged between the air-inlet grille and the heat exchanger.

Figure 1:
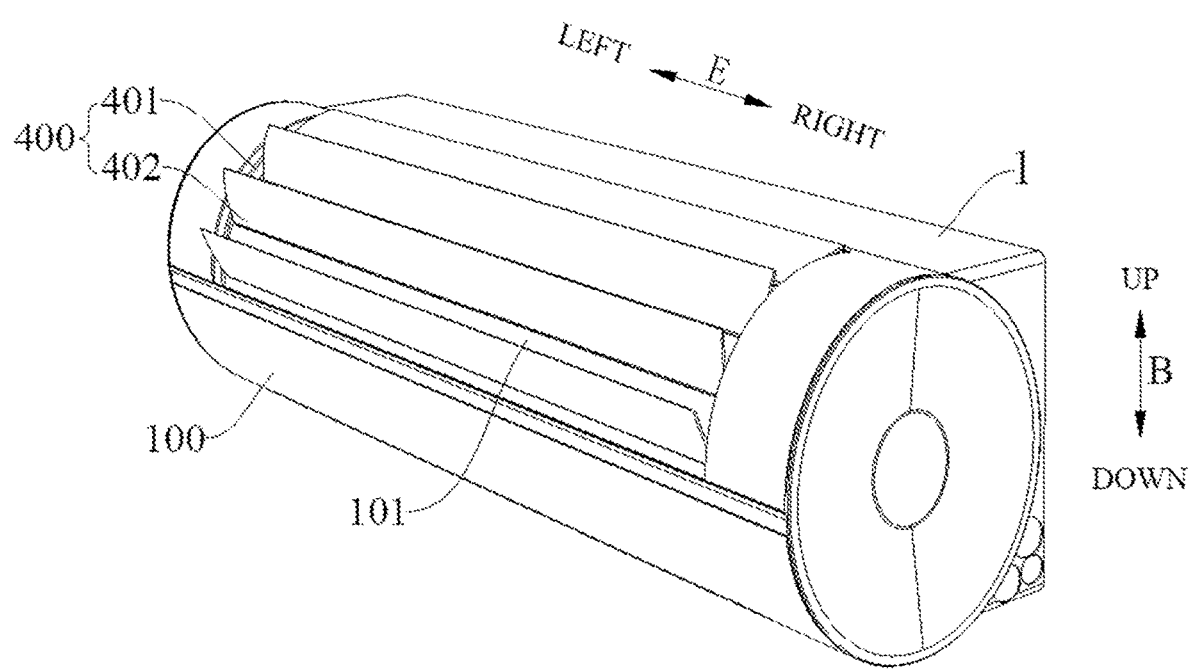
FIG. 1 is a schematic view of a wall-mounted air conditioner according to some embodiments of the present disclosure.

REFERENCE NUMERALS 1 wall-mounted air conditioner;
100 housing; 101 first air inlet; 102 air duct; 1021 air inflow section; 1022 air outflow section;
200 heat exchanger;
300 fan wheel;
400 air-inlet grille; 401 frame; 402 blade;
500 filtration member;
600 water receiving tray.

DETAILED DESCRIPTION

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

A wall-mounted air conditioner 1 according to embodiments of the present disclosure is described below with reference to the accompanying drawings.

Figure 2:
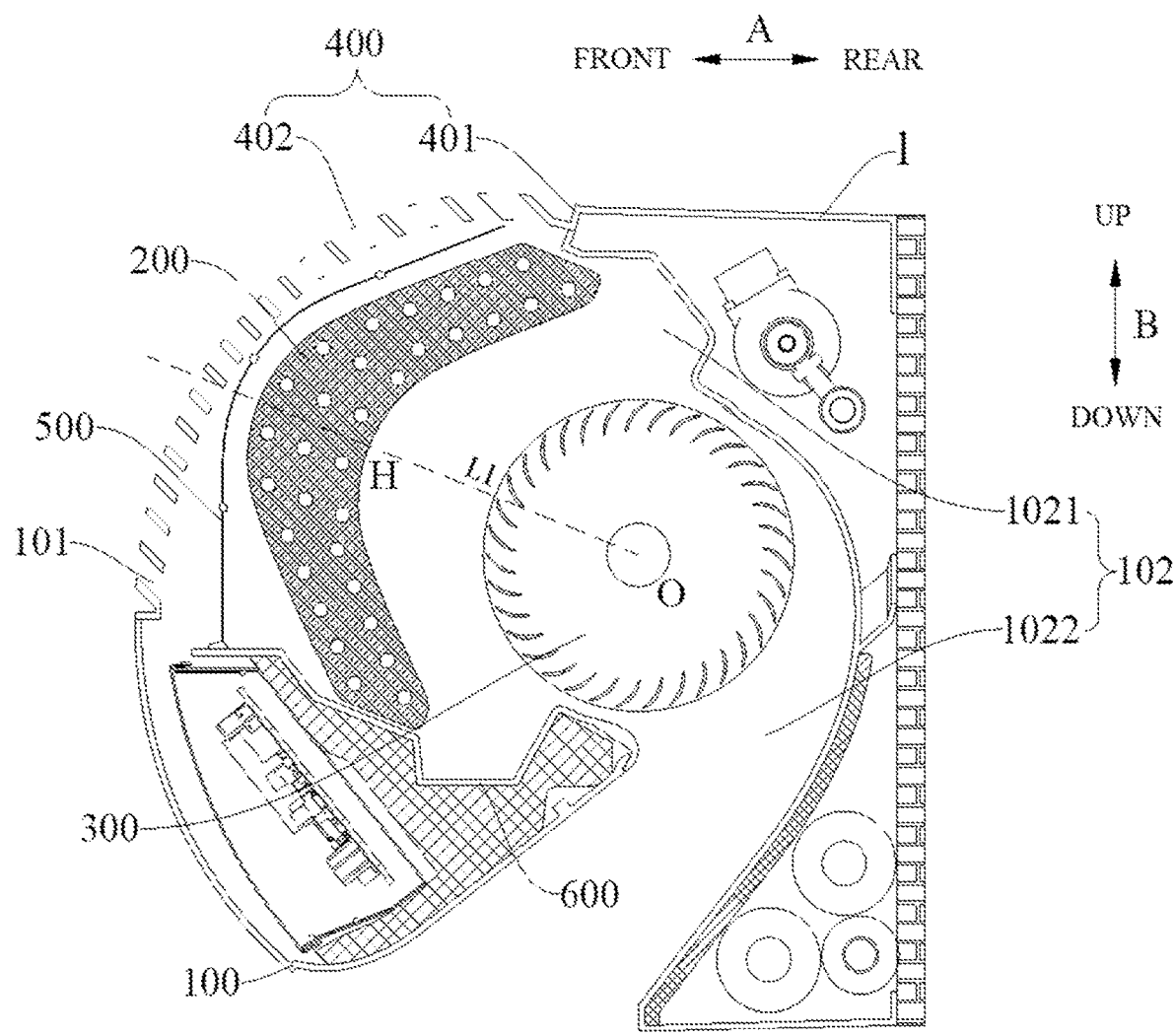
FIG. 2 is a cross sectional view of a wall-mounted air conditioner according to some embodiments of the present disclosure.
Figure 3:
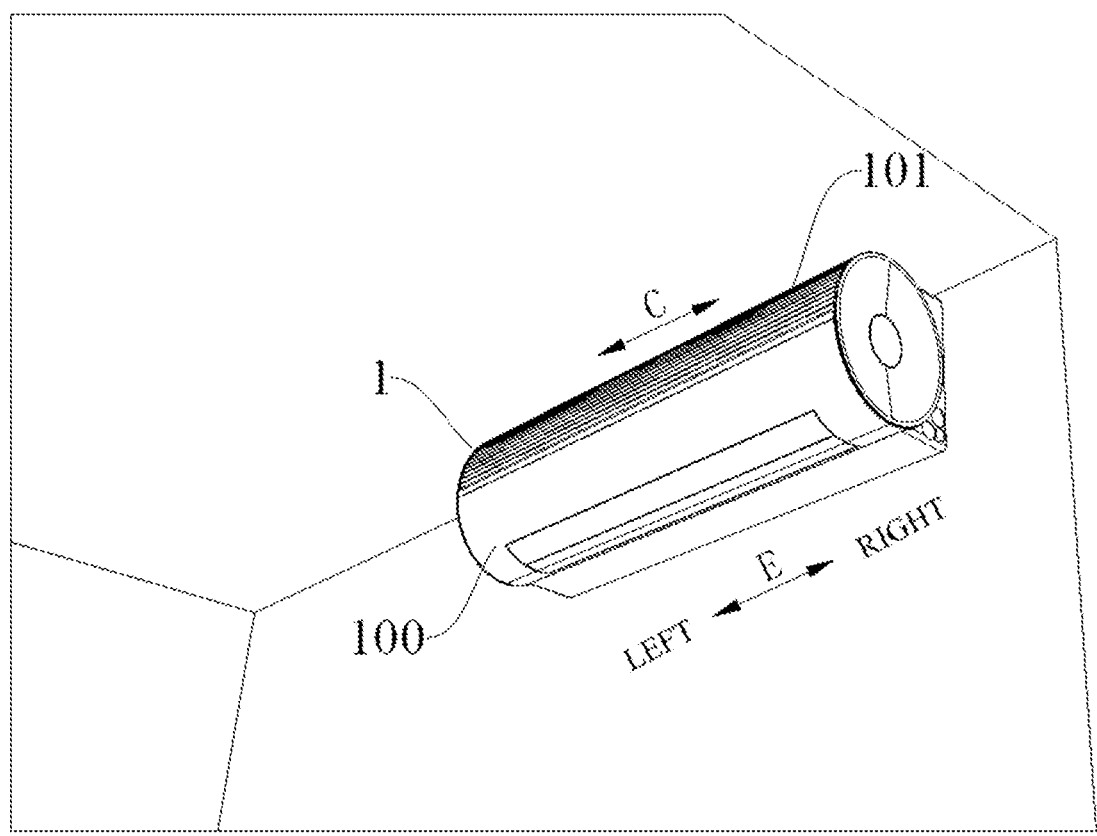
FIG. 3 is an installation schematic view of a wall-mounted air conditioner according to some embodiments of the present disclosure.

As illustrated in FIGS. 1 to 3, the wall-mounted air conditioner 1 according to embodiments of the present disclosure includes a housing 100 and a heat exchanger 200. A front surface of the housing 100 is provided with a first air inlet 101. The heat exchanger 200 is arranged in the housing 100 and corresponding to the first air inlet 101, and the heat exchanger 200 is curved or bent towards the first air inlet 101.

As illustrated in FIG. 2, the front surface of the housing 100 is a surface of the housing 100 that can be seen by a horizontal backward line of sight. That is, the surface of the housing 100 that can be seen by the horizontal backward line of sight is the front surface of the housing. For example, when an observer's eyes are roughly at the same level as the housing 100 and the observer is located in front of the housing 100, the surface of the housing 100 that can be seen by the observer is the front surface of the housing 100. For example, the wall-mounted air conditioner 1 may be mounted on a wall surface. A direction away from the wall surface along the horizontal direction represents a forward direction, and a direction toward the wall surface along the horizontal direction represents a rearward direction. A front-and-rear direction is as indicated by an arrow A in FIG. 2, and an up-and-down direction is as indicated by an arrow B in FIG. 2.

The wall-mounted air conditioner 1 according to some embodiments of the present disclosure may be hanged on an indoor wall, and the ambient air does not need to enter an interior of the wall-mounted air conditioner 1 from directly above the housing 100. Thus, a distance between the wall-mounted air conditioner 1 and an indoor top wall may be (e.g., greatly) reduced or removed, the indoor space utilization, in particular for the indoor space with low height, may be improved, and sense of crampedness of the indoor space may be effectively reduced or eliminated. The wall-mounted air conditioner 1 according to embodiments of the present disclosure has very low requirements for mounting space, and as long as the mounting space can accommodate the wall-mounted air conditioner 1, there is no need to leave air inlet space above the wall-mounted air conditioner 1, which can expand the applicability of the wall-mounted air conditioner 1.

In some embodiments, a part of the first air inlet 101 located at the front surface of the housing 100 is inclined upwards towards the wall, which may be understood as an installation surface, relative to the vertical plane. In in this way, when a user stands on an indoor floor, the user cannot see the interior of the housing 100 (the wall-mounted air conditioner 1) through the first air inlet 101, and the internal structure of the housing 100 (the wall-mounted air conditioner 1) is not exposed to the user. Thus, the visual comfort of the user may be improved.

Furthermore, in scenarios where the air enters from the top, the top space is often limited and narrow, and the air inflow volume will be limited due to the narrow top space. In some embodiments, the first air inlet 101 is arranged at the front surface of the housing 100 such that the air entering the housing 100 via the first air inlet 101 passes through the heat exchanger 200 directly for adequate heat exchange with the heat exchanger 200. That is to say, the air inflow volume of the wall-mounted air conditioner 1 may not be limited by the narrow space at the top. The air enters from the front surface of the housing 100, the air inflow volume may be effectively increased, the flow rate of the air passing through the heat exchanger 200 may be (e.g., significantly) improved, and the heat exchange efficiency of the heat exchanger 200 may be (e.g., greatly) improved.

In some embodiments, the first air inlet 101 is located in a front surface of the housing 100. Thus, there is no need to arrange a heat exchanger 200 in a roughly inverted V shape below the first air inlet 101. That is, it is unnecessary to mount a water receiving tray having a width greater than or equal to a width of the roughly inverted V-shaped heat exchanger 200 at a lower end portion of the heat exchanger 200. Since the first air inlet 101 is located in the front surface of the housing 100, the water receiving tray 600 will not prevent the airflow from flowing to the heat exchanger 200. For example, the water receiving tray 600 may not pass an airflow path to the heat exchanger 200, which may (e.g., greatly) improve the heat exchange efficiency of the heat exchanger 200. In some embodiments, the water receiving tray 600 is arranged below the heat exchanger 200.

In addition, the heat exchanger 200 is corresponding to the first air inlet 101, such that the air entering the housing 100 may directly contact the heat exchanger 200 for heat exchange to shorten an air inflow path of the wall-mounted air conditioner 1. Moreover, the heat exchanger 200 has a curved or bent structure, and thus a heat exchange area of the heat exchanger 200 may be increased, improving the heat exchange efficiency of the wall-mounted air conditioner 1.

In some embodiments, the heat exchanger 200 is in the bent shape. That is, the heat exchanger 200 may be a combined structure of a plurality of heat exchanger 200 segments with different inclination angles. For example, the heat exchanger 200 has a V-shaped structure with a substantially rearward-facing opening. In some embodiments, the heat exchanger 200 is in the curved shape. That is, the cross section of the heat exchanger 200 is a curved surface or an at least partially curved surface. For example, the heat exchanger 200 is arced towards the first air inlet 101. In other words, an outer side edge and an inner side edge of the cross section of the heat exchanger 200 are curved towards the first air inlet 101. Thus, the heat exchange area of the heat exchanger 200 may be further increased, and the heat exchange efficiency of the wall-mounted air conditioner 1 may be improved.

In some embodiments, as illustrated in FIG. 2, a thickness of the heat exchanger 200 gradually decreases along a direction from a middle portion of the heat exchanger 200 to an upper end of the heat exchanger 200 (a direction from bottom to top as illustrated in FIG. 2), and the thickness of the heat exchanger 200 gradually decreases along a direction from the middle portion of the heat exchanger 200 to a lower end of the heat exchanger 200 (a direction from top to bottom as illustrated in FIG. 1). It could be understood that, the thickness of the middle portion of the heat exchanger 200 is greater than the thicknesses of the upper end of the heat exchanger 200 and the lower end of the heat exchanger 200.

When the wall-mounted air conditioner 1 is in operation, the heat exchanger 200 has a structure protruding towards the first air inlet 101 such that the air flowing through the first air inlet 101 contacts the middle portion of the heat exchanger 200. The heat exchanger 200 of the wall-mounted air conditioner 1 according to embodiments of the present disclosure has a relatively large middle portion, which may perform heat exchange with the majority of the air entering the first air inlet 101. Moreover, the air inflow volume at an edge of the first air inlet 101 is smaller than at the middle portion of the first air inlet 101. Thus, the thicknesses of the upper end of the heat exchanger 200 and the lower end of the heat exchanger 200 can be reduced, and the heat exchange efficiency of the heat exchanger 200 is not affected. The wall-mounted air conditioner 1 according to embodiments of the present disclosure may ensure the heat exchange efficiency of the heat exchanger 200 while reducing the size of the heat exchanger 200, reducing the production cost of the wall-mounted air conditioner 1.

In some embodiments, as illustrated in FIG. 2, the housing 100 is provided with a fan wheel 300, and a position of the middle portion of the heat exchanger 200 is higher than a rotation axis of the fan wheel 300. It could be understood that, the heat exchanger 200 is arranged between the first air inlet 101 and the fan wheel 300, and the first air inlet 101 opens towards the direct front and/or the front upper part and/or the front lower part of the housing 100 such that the wall-mounted air conditioner 1 can achieve air inflow from the front. Furthermore, a curving direction of the heat exchanger 200 is towards the first air inlet 101, and the heat exchanger 200 may perform adequate heat exchange with the air entering the first air inlet 101, to further improve the heat exchange efficiency of the wall-mounted air conditioner 1.

In some embodiments, as illustrated in FIG. 2, the wall-mounted air conditioner 1 further includes an air duct 102 and a fan wheel 300. The air duct 102 is located in the housing 100, and the air duct 102 includes an air inflow section 1021 and an air outflow section 1022 connected to each other. The air inflow section 1021 has an inlet air duct, and the air outflow section 1022 has an outlet air duct. A part of the fan wheel 300 is located in the inlet air duct, and the rest (e.g., a remaining portion, all remaining portions) of the fan wheel 300 is located in the outlet air duct. The fan wheel 300 is configured to generate an air exhaust force, such that the air enter the inlet air duct from the first air inlet 101, passes through the fan wheel 300, enters the outlet air duct and finally is discharged from an air outlet of the outlet air duct. The heat exchanger 200 is located in the inlet air duct, and the heat exchanger 200 is corresponding to the first air inlet 101, to exchange heat with the air entering inlet air duct from the first air inlet 101. The wall-mounted air conditioner 1 according to embodiments of the present disclosure is provided with the fan wheel 300 in the air duct 102, and thus can improve the flow volume and velocity of the air passing through the heat exchanger 200, to further improve the heat exchange efficiency of the heat exchanger 200. Furthermore, the fan wheel 300 is arranged at a junction of the inlet air duct and the outlet air duct, and thus the structure of the wall-mounted air conditioner 1 may be more reasonable.

As illustrated in FIG. 2, in a vertical plane perpendicular to a length direction of the air duct 102, the rotation axis of the fan wheel 300 and the vertical plane are intersected at a base point, and a first connection line between a middle point H of a projection of an inner side surface of the heat exchanger 200 and the base point O is L1. The first connection line L1 substantially coincides with a centerline of the air inflow section 1021. It should be noted that the length direction of the air duct 102 is indicated by an arrow C illustrated in FIG. 3. The length direction of the air duct 102 may be consistent with a length direction of the wall-mounted air conditioner 1. That is, the length direction of the wall-mounted air conditioner 1 is along the direction indicated by the arrow C in FIG. 3.

It could be understood that, the first connection line L1 substantially coincides with the centerline of the air inflow section 1021, and the heat exchanger 200 is directly corresponding to the first air inlet 101 and the fan wheel 300, such that the heat exchange effect of the heat exchanger 200 may be better and the heat exchange efficiency of the wall-mounted air conditioner 1 may be further enhanced.

In some embodiments, the housing 100 has a second air inlet (not illustrated), and the second air inlet is located in a top surface of the housing 100, e.g., an upper end face of the housing 100 as illustrated in FIG. 2. It could be understood that, the upper end of the housing 100 is provided with the second air inlet such that the wall-mounted air conditioner 1 can receive the air from the top, to further increase the air inflow volume, expand the applicability range of the wall-mounted air conditioner 1 and meet use requirements of the wall-mounted air conditioner 1 in different occasions.

Further, a part of the heat exchanger 200 is located between the first air inlet 101 and the fan wheel 300, and another part of the heat exchanger 200 is located between the second air inlet and the fan wheel 300. It could be understood that, the first air inlet 101 and the second air inlet are corresponding to the heat exchanger 200 to improve the heat exchange efficiency of the heat exchanger 200. That is, the air entering the inlet air duct from the first air inlet 101 and the second air inlet passes through the heat exchanger 200 for heat exchange, and then is guided into the outlet air duct under the rotation action of the fan wheel 300.

In some embodiments, as illustrated in FIGS. 1 and 3, the wall-mounted air conditioner 1 further includes an air-inlet grille 400. The air-inlet grille 400 includes a frame 401 and a plurality of blades 402, the frame 401 is arranged at the first air inlet 101, and the plurality of blades 402 is arranged along a circumferential direction of the housing 100. In some embodiments, each blade 402 is rotatably arranged to the frame 401 between an open position and a closed position. When the wall-mounted air conditioner 1 stops operation, the blades 402 may be rotated to the closed position to cover the first air inlet 101, to prevent from dust and impurity from entering the housing 100, reduce cleaning frequency of the interior of the wall-mounted air conditioner 1, and result in high utility.

In some embodiments, as illustrated in FIGS. 1 and 2, when the air-inlet grille 400 is in the closed position, the cross section of the air-inlet grille 400 is an arc-shaped surface, and the arc-shaped surface protrudes outwards. It could be understood that, the air-inlet grille 400 in the closed position has an arc-shaped structure protruding forwards, thus a surface area of the air-inlet grille 400 may be increased such that more air can enter the housing 100 through the air-inlet grille 400, to further increase the air inflow volume of the first air inlet 101.

Further, as illustrated in FIGS. 1 and 2, the wall-mounted air conditioner 1 further includes a filter screen 500. The filter screen 500 is arranged between the air-inlet grille 400 and the heat exchanger 200. The wall-mounted air conditioner 1 according to embodiments of the present disclosure is provided with the filter screen 500, which may filter the air entering the first air inlet 101, reduce the probability of the dust and the impurity entering the interior of the housing 100 and reduce the later use and maintenance costs of the wall-mounted air conditioner 1.

In some embodiments, the filter screen 500 is detachably connected to the housing 100, to facilitate daily cleaning of the filter screen 500. Specifically, a cross section of the filter screen 500 is also an arc surface, and the protruding directions of the filter screen 500, the heat exchanger 200 and the air-inlet grille 400 are consistent. Thus, the wall-mounted air conditioner 1 may have a compact structure, and a relatively high cleanliness.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, unless limited otherwise. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, reference to "an embodiment," "some embodiments," "an example," "a specific example," or "some examples," means that a particular feature, structure, material, or characteristic described in connection with the embodiment or example is included in at least one embodiment or example of the present disclosure. In the present specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A wall-mounted air conditioner, comprising:
   a housing, a front surface of the housing being provided with an air inlet;
   an air duct formed in the housing and comprising an air inflow section connected to an air outflow section;
   a single integral heat exchanger arranged in the housing and corresponding to the first air inlet, the single integral heat exchanger being curved or bent towards the air inlet and having at least a part located in the air inflow section; and
   a fan wheel having a part located in the air inflow section and the rest of the fan wheel is located in the air outflow section,
   wherein in a vertical plane perpendicular to a length direction of the air duct, a rotation axis of the fan wheel and the vertical plane are intersected at a base point, and a first connection line between a middle point and a line connecting the base point and the middle point coincides with a centerline of the air inflow section, and the middle point is along a line of symmetry of the single integral heat exchanger.

2. The wall-mounted air conditioner according to claim 1, wherein the single integral heat exchanger is in an arc shape protruding towards the air inlet.

3. The wall-mounted air conditioner according to claim 1, wherein a thickness of the single integral heat exchanger gradually decreases along a direction from a middle portion of the single integral heat exchanger to an upper end of the single integral heat exchanger, and the thickness of the single integral heat exchanger gradually decreases along a direction from the middle portion of the single integral heat exchanger to a lower end of the single integral heat exchanger.

4. The wall-mounted air conditioner according to claim 3, wherein the housing is provided with the fan wheel, and a position of the middle portion of the single integral heat exchanger is higher than the rotation axis of the fan wheel.

5. The wall-mounted air conditioner according to claim 1, wherein the housing has a second air inlet, and the second air inlet is located in a top surface of the housing.

6. The wall-mounted air conditioner according to claim 5, wherein the housing is provided with the fan wheel, and a part of the single integral heat exchanger is located between the air inlet and the fan wheel, and another part of the single integral heat exchanger is located between the second air inlet and the fan wheel.

7. The wall-mounted air conditioner according to claim 1, further comprising an air-inlet grille, wherein the air-inlet grille comprises a frame and a plurality of blades, the frame is arranged at the air inlet, and the plurality of blades are arranged on the frame at intervals.

8. The wall-mounted air conditioner according to claim 7, wherein each blade is rotatably arranged on the frame between an open position and a closed position.

9. The wall-mounted air conditioner according to claim 8, wherein in the closed position, a cross section of the air-inlet grille is an arc-shaped surface protruding outwards.

10. The wall-mounted air conditioner according to claim 7, further comprising a filter screen arranged between the air-inlet grille and the single integral heat exchanger.

11. The wall-mounted air conditioner according to claim 10, wherein a cross section of the filter screen is an arc surface that matches a shape of the single integral heat exchanger and the air-inlet grille.

12. The wall-mounted air conditioner according to claim 11, wherein the filter screen is detachably connected to the housing.

13. The wall-mounted air conditioner according to claim 8, wherein the plurality of blades are configured to rotate to the closed position to cover the air inlet.

14. The wall-mounted air conditioner according to claim 1, further comprising a water receiving tray arranged below the single integral heat exchanger.

15. The wall-mounted air conditioner according to claim 14, wherein an airflow path from the air inlet to the single integral heat exchanger is not blocked by the water receiving tray.

16. The wall-mounted air conditioner according to claim 1, wherein the air outflow section comprises an outlet air duct, and the fan wheel is configured to rotate so that air entering the air inlet is guided into the outlet air duct after passing through the single integral heat exchanger.

* * * * *